United States Patent [19]

Araki et al.

[11] 4,020,312
[45] Apr. 26, 1977

[54] METHOD OF MANUFACTURING THICK, HIGH-STRENGTH STEEL PIPE FOR LOW TEMPERATURE SERVICE

[75] Inventors: Mutsuro Araki; Bunshiro Sakai; Itaru Watanabe; Makoto Yamada, all of Yokohama; Koshiro Tsukada, Fukuyama; Tomokazu Godai, Kamakura; Isao Aida, Fujisawa; Masatoshi Nakagaki, Yokohama, all of Japan

[73] Assignees: Nippon Kokan Kabushiki Kaisha, Tokyo; Kobe Steel Ltd., Kobe, both of Japan

[22] Filed: Nov. 21, 1975

[21] Appl. No.: 634,325

[30] Foreign Application Priority Data

Nov. 27, 1974  Japan ............................ 49-135557

[52] U.S. Cl. .................. 219/61; 148/12 F; 219/73 R; 219/74; 219/145
[51] Int. Cl.² .................. B23K 31/06; B23K 9/16; B23K 9/18; B23K 35/34
[58] Field of Search .................. 219/61, 60 R, 60 A, 219/73, 74, 145, 146; 148/12 F, 12.1; 138/156, 171, 177

[56] References Cited

UNITED STATES PATENTS

| | | | |
|---|---|---|---|
| 3,227,849 | 1/1966 | Thielsch | 219/61 |
| 3,328,556 | 6/1967 | Nelson et al. | 219/61 X |
| 3,404,249 | 10/1968 | Dorschu | 219/145 X |
| 3,738,874 | 6/1973 | Allten et al. | 148/12 F |
| 3,787,250 | 1/1974 | Korschynsky et al. | 148/12 F |
| 3,834,949 | 9/1974 | Heitmann et al. | 148/12 F |
| 3,849,209 | 11/1974 | Ishizaki et al. | 148/12 F |
| 3,857,740 | 12/1974 | Gondo et al. | 148/12 F |
| 3,860,777 | 1/1975 | Sawhill, Jr. | 219/61 |
| 3,902,927 | 9/1975 | Pernstal | 148/12 F |
| 3,911,244 | 10/1975 | Nakamura et al. | 219/146 |

Primary Examiner—Bruce A. Reynolds

[57] ABSTRACT

A method of manufacturing a thick, high-strength steel pipe for low temperature service comprising the steps of forming into tubular shape a steel plate having a thickness of over 12 mm and a specific composition, of which the $C_{eq}$ value is adjusted to less than 0.50, when the Mn content is less than 1.0 % whereas the $C_{eq}$ value is adjusted to less than 0.45 when the Mn content is over 1.0 % and less than 2.0 %, and nextly of welding said tube form at high speeds and high efficiency by the process of single electrode or multiple electrode large-current gas-shielded arc welding with one pass per electrode on each side of the seam at a specific condition, each electrode preferably consisting of a solid wire essentially containing less than 0.3 % Ti with or without the addition of less than 0.01 % B, and said steel pipe having, in its as-welded condition, mechanical properties such that the yield point of the base metal portion is over 60,000 psi and the weld zone has a maximum hardness of less than Hv10-280 and a Charpy test absorbed energy of over 7 Kg.m at −10° F. Even when the $C_{eq}$ value of said steel plate is less than 0.65, a thick, high-strength steel pipe for low temperature service having equal mechanical properties to the above mentioned pipe may be manufactured, after welding, by subjecting the welded pipe to a post heat treatment in which the welded pipe is held at a temperature between 500° and 700° C for less than 1 hour.

4 Claims, 9 Drawing Figures

METHOD OF MANUFACTURING THICK, HIGH-STRENGTH STEEL PIPE FOR LOW TEMPERATURE SERVICE

BACKGROUND OF THE INVENTION

The present invention relates to improvements in and relating to the method of manufacturing line pipes for use in cold districts where high strength and high toughness are required as well as high-strength steel pipes which are required to retain a satisfactory toughness at low temperatures. More particularly, the present invention relates to an improved method of manufacturing such steel pipes wherein the steel plate which has been formed by such forming process as UOE or spiral process is arc welded to produce the desired steel pipe.

As pipe line installations installed in the cold districts for conveying petroleum, natural gas and the like have recently become increasing-large, there has been an increasing demand for thick, high-strength steel pipes which have excellent strength and retain excellent toughness at low temperatures. Generally, it has been customary to manufacture the large-diameter steel pipes for such applications on a mass production basis by using such process as the UOE, spiral, cage forming, bending roll forming or the like. It is needless to say that these pipe manufacturing processes in which the welding is accomplished after the plates have been formed, naturally have a very great demand for higher operating speeds and higher operating efficiency. In the past, the tandem sequence type, large heat input submerged arc welding process with one pass per electrode on each side of the seam has been employed for the regular welding of the tubes prepared by the above-mentioned forming processes. In that case, while new processes such as the Q - T treatment of pipe have been proposed to meet the above-mentioned requirements, there are many problems which have not been solved as yet. One of these unsolved problems is how to provide a satisfactory strength and toughness in a steel plate constituting the base metal for welded pipe. For this purpose, a so-called controlled rolling (CR) process has been proposed and practiced in which the total rolling reduction during the rolling operations effected at relatively low temperatures of below 900° C is increased. A disadvantage of this process is that there is a limit to the total rolling reduction at such low temperatures which involve an increased deformation resistance and therefore the effects of the CR process on thick steel plates cannot be as high as desired. Consequently, the thick steel plate must be subjected to additional heat treatments such as quenching and tempering to produce the desired high strength and toughness. However, it is self-evident that not only these properties are essential in the base metal but also these properties in the weld zone must be satisfactorily high. In the case of a line pipe designed for conveying natural gas from a cold district, the requirements for low temperature toughness in both the base metal and weld zone are extremely severe, since such line pipe is designed for conveying the natural gas under high pressure at high speeds. Particularly, the hardness of the weld zone is limited to low values for the purpose of preventing the danger of stress corrosion cracking of the pipe due to the sulfides contained in the natural gas. On the other hand, it is also self-evident that the addition or increase in the amount of alloying elements is necessary since the manufacture of thick, high-strength high-toughness steel plate requires the controlled rolling or heat treatments as well. For instance, to improve the hardenability of the material, it is necessary to increase the Mn content or add such elements as Cr and Mo. These elements are essential alloying elements for providing the desired high toughness in the base metal. However, while the base metal is satisfactory in terms of its properties, the properties, particularly toughness in the weld zone is entirely different from that of the base metal. In other words, with the presently available large heat input, submerged arc welding process, it is necessary to increase the heat input as the thickness of the steel pipe increases in order to meet the desired welding efficiency with one pass per electrode on each side of the seam. For instance, where the steel is welded with this process using as high a heat input as 65,000 Joule/cm. the properties, particularly low temperature toughness in the heat affected zone (hereinafter simply referred to as H.A.Z) adjacent to the bond or fusion line of the weld zone is inevitably deteriorated. The present tendency is toward preventing and controlling the deterioration of the the properties in weld zone by changing the chemical composition of a steel plate or base metal. However, it is clear that the degree of deterioration in properties of the weld zone increases as higher quality steel is used as the base metal. As regards the maximum hardness of the H.A.Z, practically all of the alloying elements required for providing a high degree of toughness in the base metal tend to increase the maximum hardness of the H.A.Z. Thus, while it has been considered imperative to use steel plates having higher alloy chemical compositions as the base metals to obtain the desired high-strength, high-toughness thick steel pipes, the presently available welding processes bring about relative deterioration of the properties in the H.A.Z. and increase its hardness, thus making it impossible to obtain the desired steel pipe.

To avoid the above-mentioned problem of deterioration in toughness, so far as the presently available submerged arc welding process is used, there is no other way but to control the welding heat input and this controlled heat input inevitably necessitates the deposition of the weld metal in multiple layers. The use of such multi-layer submerged arc welding with a reduced heat input requires the flux removing operation upon completion of each pass with a resulting deterioration of the welding efficiency. Another disadvantage is the necessity of using a high basic flux for ensuring the desired toughness at low temperatures, since such high basic flux frequently gives rise to welding defects. Even if the steel plate is thin permitting the deposition of the weld metal with one pass per electrode on each side of the seam, the reduced heat input results in an increased rate of cooling of the heat affected zone and the maximum hardness of the H.A.Z is inevitably increased. This rising tendency in the maximum hardness tends to become marked as the amounts of alloying elements added to the steel plate or base metal are increased. In view of these circumstances, it may safely be said that in view of alloy compositions of steel plates or base metals, the submerged arc welding process is not suitable as the process of welding large-diameter thick steel pipes for the manufacture of very low temperature line pipes. Particularly, in the case of steel plates of over 12 mm thick, it may be impossible to produce steel pipes having no such defects by using the submerged arc welding process.

Although the use of other low heat input welding process, e.g., the MIG welding process or $CO_2$ gas shielded welding process may be considered, these processes are so designed that the welding is accomplished in an atmosphere consisting principally of argon or carbon dioxide gas by operating a small-diameter wire electrode of less than 2.0 mm$\phi$ at welding currents lower than 500 amp. In these cases, while the problem of deteriorated low temperature toughness in the welding heat affected zone due to the low heat input is overcome, the welding efficiency is reduced and the maximum hardness of the H.A.Z is increased as in the case of the low heat input, submerged arc welding. To prevent the lowering of welding efficiency, a welding process has been proposed in which a plurality of small-diameter wire electrodes are arranged in a straight row along the direction of welding to accomplish the continuous welding. However, it has been found that the improved welding efficiency provided by this process is also far short of the drastic improvement of the welding efficiency and the deficiencies on the maximum hardness remain almost unsolved. In other words, it should be concluded that none of the presently available processes for making welded pipes can be used as the practical welding process for making steel pipes having high strength and high toughness in both the base metal and the weld zone.

SUMMARY OF THE INVENTION

It is an object of the present invention to provide an improved method of manufacturing a high-strength steel pipe well suited for use as a cold district line pipe which must retain high strength and high toughness as well.

It is another object of the present invention to provide an improved method of manufacturing a high-strength steel pipe having high strength and toughness in both the base metal portion and the weld zone.

It is still another object of the present invention to provide an improved method of manufacturing a high-strength steel pipe having an excellent low temperature toughness which is capable of welding a steel plate with greater welding speed and efficiency.

In accomplishing these and other equally desirable objects, there is thus provided in accordance with the present invention an improved method of manufacturing a thick, low-temperature high-strength steel pipe comprising the steps of:

a. forming into tubular shape a steel plate having a thickness of over 12 mm and containing: C, 0.01 – 0.15%; Si, 0.02 – 0.50%; Mn, 0.1 – 2.0%; P, 0.020% or less; S, 0.020% or less; at least one element selected from the group consisting of Cu, Ni, Cr and Mo and/or W in an amount between 0.1 and 1.0% when selecting Cu, Cr and Mo and/or W or in an amount between 0.1 and 9.50% when selecting Ni; at least one element selected from the group consisting of acid soluble Al(-hereinafter simply referred to as sol Al), Zr, Ti, V, Nb and B in a total amount between 0.005 and 0.20%, the remainder being Fe and unavoidable impurities, with the carbon equivalent being adjusted to less then 0.50 when containing less than 1.0% Mn or to less than 0.45 when containing more than 1.0% Mn; and b. welding the thus formed steel plate into a steel pipe by subjecting the formed steel plate to a single electrode or multiple electrode large-current gas shielded arc welding, one pass per electrode on each side of the seam, in an atmosphere of a mixed shielding gas comprising principally an inert gas with an addition of less than 30% of carbon dioxide gas or less than 5% of oxygen and supplied at an overall flow rate between 50 and 200 l/min with one or plurality of solid wire consumable electrodes each having a large diameter between 3.0 and 6.4 mm$\phi$ and operated at a welding current between 600 and 1500 amp, arc voltage between 23 and 36 volts and welding speed between 300 and 1500 mm/min; and said steel pipe thus obtained having, in its as-welded condition, mechanical properties such that the yield point of its base metal portion is over 60,000 psi and its weld zone has a maximum hardness of less than Hv10-280 and a Charpy test absorbed energy of over 7 Kg.m at $-10°$ F.

According to another form of the method of this invention, where the carbon equivalent of the above-mentioned steel plate has been adjusted to less than 0.65, after the arc welding has been accomplished, the welded steel pipe is subjected to a post heat treatment which holds it at a temperature between 500° and 700° C for less than 1 hour thus providing the steel pipe with the equivalent mechanical properties as the previously mentioned steel pipe.

According to still another form of the method of this invention, the arc welding involves use of at least one solid wire electrode containing essentially 0.01 to 0.3% of Ti with or without the addition of 0.0005 to 0.01% of B.

The carbon equivalent (hereinafter simply referred to as a $C_{eq}$) is obtained, as is well known in the art, from the following equation.

$$C_{eq} = C + 1/6\ Mn + 1/24\ Si + 1/5\ Cr + 1/4\ Mo + 1/40\ Ni$$

The features of the present invention will be further classified as follows.

The first feature of the present invention resides in the chemical composition of the steel plate or the base metal. The chemical composition of the base metal is adjusted as follows to make effective the high-speed, high-efficiency gas shielded arc welding according to the invention. Namely, the composition is adjusted so that it contains C, 0.01 to 0.15%; Si, 0.02 to 0.50%; Mn, 0.1 to 2.0%; P, less than 0.020%; S, less than 0.020%; at least one element selected from the group consisting of Cu, Ni, Cr and Mo and/or W in an amount between 0.1 and 1.0% when selecting Cu, Cr and Mo and/or W or in an amount between 0.1 and 9.50% when selecting Ni; at least one element selected from the group consisting of Sol Al, Zr, Ti, V, Nb and B in a total amount between 0.005 to 0.20%, the remainder being Fe and unavoidable impurities, with the $C_{eq}$ being adjusted to less than 0.50 when the Mn content is less than 1.0% or to less than 0.45% when the Mn content is over 1.0%. The thus manufactured steel plate of over 12 mm in thickness is formed into a tubular shape and then welded into a pipe by the process of single electrode or multiple electrode large-current gas shielded arc welding.

The second feature of the present invention consists in accomplishing the single electrode or multiple electrode large-current gas shielded arc welding under the following conditions. Namely, the welding of the steel plate is accomplished in an atmosphere of a mixed shielding gas comprising principally an inert gas with the addition of less than 30% of carbon dioxide gas or less than 5% of oxygen and supplied at an overall flow rate between 50 and 200 l/min by using a single or plurality of electrodes each consisting of a large-diameter solid wire consumable electrode of 3.0 to 6.4 mm$\phi$, one pass per each electrode at a welding current between 600 and 1500 amp, arc voltage between 23 to 36 volts and welding speed between 300 and 1500 mm/min.

The third feature of the present invention resides in that where the $C_{eq}$ of the steel plate or the base metal is greater than 0.50 in the case where the Mn content is less than 1.0% or 0.45 in the case where the Mn content is over 1.0% but less than 0.65, after the welding has occurred, the welded steel pipe is held at a temperature between 500° and 700° C for less than 1 hour. By virtue of this post heat treatment, even if the $C_{eq}$ is greater than 0.45 or 0.50 and less than 0.65, it is still possible to produce a steel pipe having the desired strength and toughness in both the base metal and the weld zone as in the case of the steel plate having a $C_{eq}$ of less than 0.45 or 0.50.

The fourth feature of the present invention is that the composition of the solid wire used for the large-current gas shielded arc welding is selected so that it contains 0.01 to 0.3% of Ti with or without the addition of 0.0005 to 0.01% of B.

The fifth and last feature of the present invention is that the steel pipe manufactured in the manner described above has mechanical properties such that the yield point of its base metal portion is over 60,000 psi and its weld zone has a maximum hardness of less than Hv10-280 and a Charpy test absorbed energy of over 7 Kg.m at $-10°$ F.

With the method of this invention, it is possible to accomplish the large-current gas shielded arc welding of the steel plate safely and easily at high speeds and high efficiency comparable with those of the conventional large heat input submerged arc welding but far superior to those of the conventional gas shielded arc welding and moreover the resulting welded steel pipe has not in its base metal portion and the weld zone those various defects which have heretofore encountered in the products of the conventional processes.

DETAILED DESCRIPTION OF THE INVENTION

The manufacturing method according to the present invention will now be described in greater detail. The first feature of the present invention, i.e., the composition of a high-strength low-temperature steel used with the method of this invention and the reasons for limiting the percentage of the constituents will now be described.

Carbon is an element necessary for ensuring the strength of a steel and particularly where a material to be welded is subjected to a quenching treatment as in the case of quenching and tempering, carbon is an essential element for obtaining the hardened structure. A carbon content of less than 0.01% cannot attain the desired effects, while any excessive increase in the carbon content results in a sharp deterioration of the toughness in the base metal and the welding heat affected zone as well and the maximum hardness is also increased. Therefore, the upper limit of the carbon content is set at 0.15%.

Silicon which is an important element for deoxidization purposes during steel making also brings about deterioration in the toughness if it is added excessively and therefore the silicon content is limited to within 0.02 and 0.50%.

Figure 1:
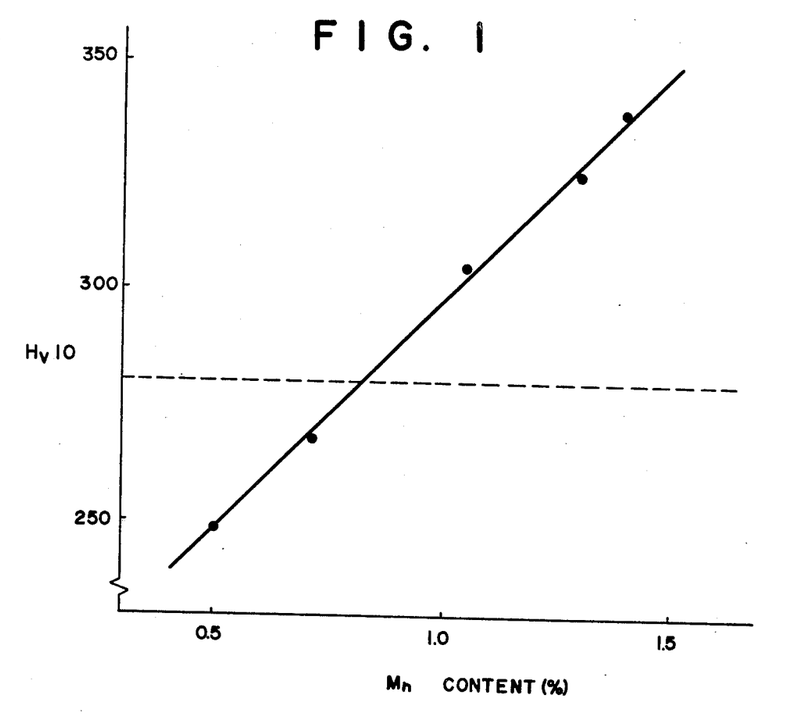
FIG. 1 is a graph showing the relationship between the carbon equivalent and the Hv10 hardness number.
Figure 2:
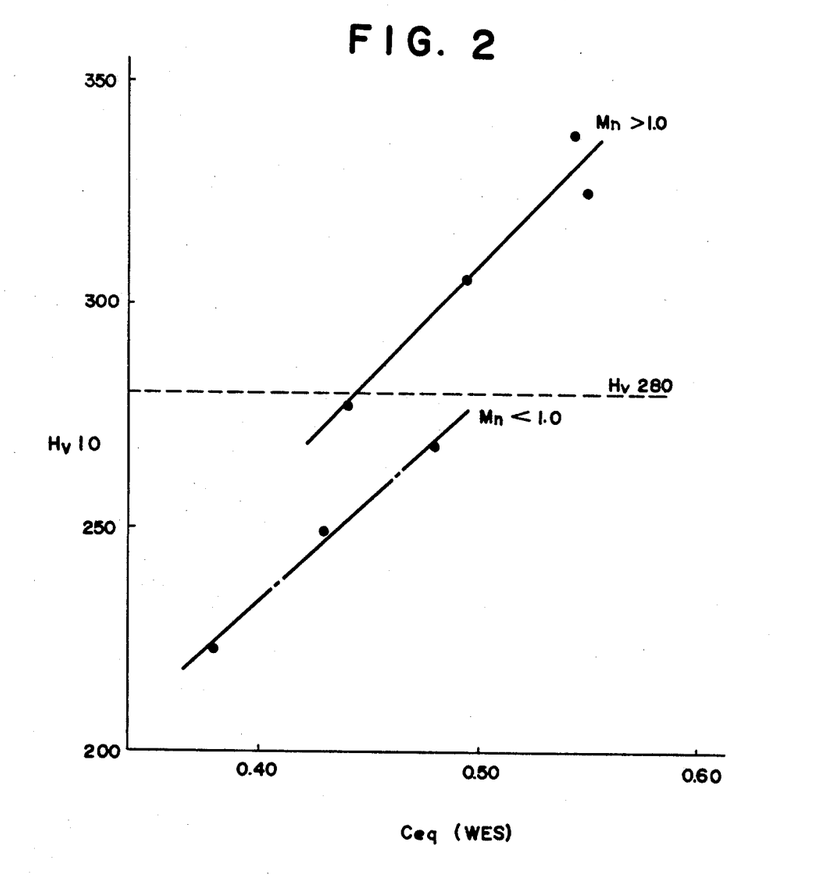
FIG. 2 is a graph showing the relationship between the Mn content and the Hv10 hardness number.

While manganese is an important element for ensuring a higher strength and an improved toughness, there is a close relation between the Mn content and the carbon equivalent and the maximum hardness of the welding heat affected zone and therefore the range of Mn contents is an important feature of the present invention. In other words, among them are the relationship shown in FIGS. 1 and 2. It will be seen from FIG. 1 that the maximum hardness is largely dependent on the Mn content of the base metal. FIG. 1 shows that the contents of Mn which ensure the maximum hardness values of less than 280 are less than about 0.8%. In this case, however, the $C_{eq}$ should be taken into consideration in addition to the Mn content. In other words, even if Mn <0.8%, for example, there still is a question whether the desired maximum hardness of less than 280 can be obtained in the presence of other highly hardening elements, namely, elements which increase the $C_{eq}$. This relationship is shown in FIG. 2 which also shows the key points for solving the problem. FIG. 2 shows the relationship between the $C_{eq}$ and the maximum hardness and it has been found that two linear relationships hold between the two quantities on the upper and lower sides of the Mn content of 1.0%. Namely, it will be seen that with Mn contents of less than 1.0%, the maximum hardness can be reduced to less than 280 by limiting the $C_{eq}$ to less than 0.50%, whereas with Mn contents greater than 1.0% it is impossible to obtain the desired maximum hardness unless the $C_{eq}$ is reduced to less than 0.45%. Consequently, even if the content of Mn is less than 0.80%, $C_{eq}$ greater than 0.50% results in maximum hardness values greater than the desired upper limit. On the other hand, even with Mn contents over 0.8%, it is possible to satisfactorily attain the desired objective by taking into consideration the $C_{eq}$ in the above-described manner. However, the upper limit is set at 2.0% because the addition of the elements in any excessive amount promotes the precipitation of carbides at the grain boundaries and causes deterioration of the toughness of the base metal making it difficult to limit the maximum hardness to the desired hardness.

Although phosphorus is an element which has a strong tendency to deteriorate the toughness of the base metal, it had no detrimental effect if its content is less than the generally permitted amounts of below 0.020%.

Sulfur is an element which has an important effect on the deterioration of toughness, particularly on the deterioration of the absorbed energy in impact tests. However, this effect is not so pronounced if the sulfur content is less than 0.020%.

The addition of copper has the effect of providing an increased strength and an improved hardenability without deteriorating the toughness or the inherent property of the steel according to the present invention. The upper limit is set at 1.0% since the addition of copper in any excessive amount gives rise to manufacturing difficulties, e.g., the occurrence of copper cracking during hot rolling.

Nickel has been used from early days as the most effective toughness improving element. This element is the most effective alloying element in improving the toughness of steel. This element is the most effective alloying element for improving the toughness in the base metal and the welding heat affected zone. However, since this element is expensive and the addition of nickel in large amounts is economically disadvantageous and also undesirable in obtaining the desired maximum hardness in the heat affected zone, the upper limit of Ni content is set at 9.50%.

Chromium and molybdenum are both effective in improving the hardenability and strength of the base metal. However, the addition of these elements in excessive amounts results in a considerable increase in the strength, has detrimental effects on the toughness and also considerably increases the maximum hardness in the welding heat affected zone. Such excessive Cr contents promote the temper brittleness which is peculiar to nickel containing steels and the addition of Mo in excessive amounts also promotes the temper-brittleness. In view of these facts, the upper limit of each of these elements is set at 1.0%. Because tungsten has the same effects as Mo, part or all of the Mo content may be replaced with W.

Soluble aluminum is an element which is necessary for deoxidation and fixation of impurity nitrogen during steel making. The addition of this element in amounts less than 0.005% has no effect, whereas the addition of over 0.2% causes embrittlement of the steel. Thus, Sol Al is added in the range of 0.005 to 0.20%.

Other elements, e.g., Zr, Ti, V and Nb have a similar effect as Al in fixing impurity nitrogen. In addition to this effect, Zr is useful as an element for controlling the shape of the inclusions. Other elements, V and Nb, are particularly useful in improving the strength and toughness of the steel when the steel plate is manufactured by the controlled rolling process. The addition of boron has similar effects as Al but the addition of B is particularly useful in improving the hardenability. However, since the addition of each of these elements in amounts over 0.20% has detrimental effects on the toughness, any element may be added in the range of 0.005 to 0.20% to substitute for part or all of the Al content.

It is needless to say that in addition to these elements, other elements, i.e., La, Ce, Mg and Ca may be added in suitable amounts for the purposes of controlling the shape of the inclusions in the steel without deteriorating the properties and characteristics as well as the effects of the steel of this invention and these elements may be selectively added in various combinations depending on the desired effects.

Within the chemical composition ranges described above, any suitable composition may be selected to obtain the desired steel plate of over 12 mm thick which meets the desired yield point of over 60,000 psi as well as the desired toughness.

The desired steel plate is then manufactured by a suitable process which is capable of maintaining the strength and toughness levels as required in the base metal after the welding has been accomplished. There is no particular limitation to the processes to be used and any of the processes known in the art may be used. For instance, the controlled rolling process, the quenching and tempering and other rolling and heat treating processes may be used. As regards the tube forming processes, any one of numerous processes may be used provided that the welding of the steel plate is accomplished after the forming has occurred.

The second feature of the present invention, namely, the single electrode or multiple electrode large-current gas shielded arc welding process according to the invention will now be described in greater detail. The welding process according to the invention has the following features over the conventional submerged arc welding process as well as the MIG or $CO_2$ welding process employing a small-diameter wire electrode.

In other words, the first feature of the welding process of this invention is the use of a large-diameter solid wire with a diameter between 3.0 and 6.4 mm $\phi$ as the consumable electrode. The use of such a large-diameter solid wire in the process of this invention is based on the following ground. Namely, in arc welding, the use of higher welding speeds tends to reduce the preheating effect on the base metal and limit the area of fusion to those portions of the steel plate which directly contact the arc due to the correlation between the speed of movement of the arc (heat source) and the velocity of heat transfer in the steel plate to be welded. This results in a considerable reduction of the melted area and a rapid temperature gradient in the base metal adjacent to the molten area with the result that the molten metal cannot be brought into intimate union with the base metal and the molten metal tends to produce a convex weld bead. Consequently, to speed up the welding requires an increase in the heat energy of the arc as well as an increase in the spread of the arc to increase the molten area. When the heat energy of the arc is increased in the welding process employing a small diameter wire, this tends rather to decrease the width of the bead due to the limited spread of the heat, through a deep weld penetration is obtained. As a result, with the ordinary small-diameter wire electrode it is impossible to accomplish the high speed welding of a thick steel plate as used with the method of the invention. In view of this fact, in the welding method of the invention the above-mentioned large-diameter wire is used to increase the welding current and reduce the current density to a low value and in this way the pinching force is prevented from increasing and the spread of the arc is increased thereby solving the problem. For example, the ratio of the welding current density between the welding current of 320 amp for a 1.6 mm $\phi$ wire and the welding current of 800 amp for a 4.0 mm $\phi$ wire is 1:0.4, thus showing that the combination of the large-diameter wire and the large current can provide a wider arc. While the range of electrode wire diameters is dependent on the balance between the welding current and the welding speed, to accomplish the high speed welding as desired in the process of the invention, the wire diameter of 3 mm $\phi$ is not sufficient to attain the intended objective, while excessively large wire diameters are disadvantageous in performing the welding operation. Consequently, the upper limit to the wire diameters is set at 6.4 mm $\phi$.

Figure 3:
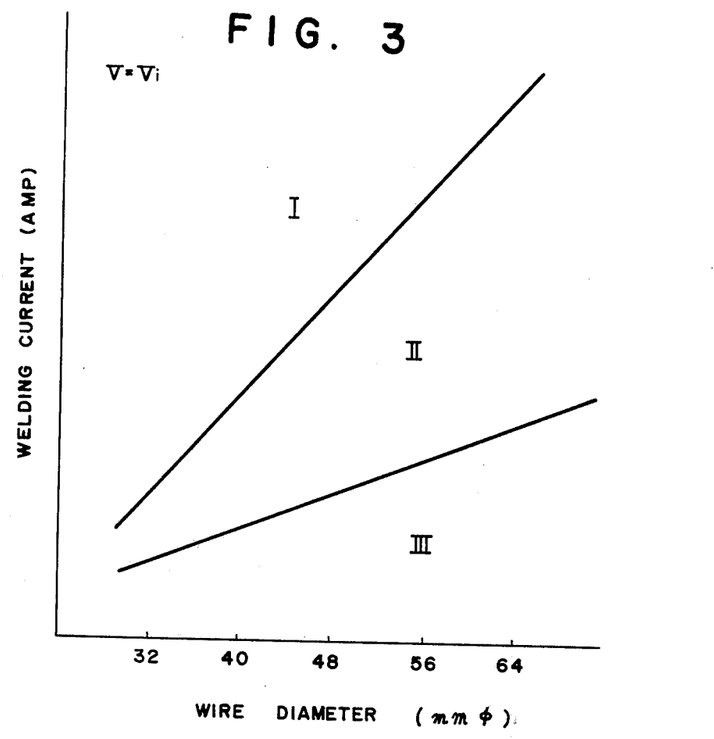
FIG. 3 is a graph showing the stable arc region in accordance with the solid wire electrode diameter and the welding current.

As regards the welding current, while it is essential to increase the welding current and thereby to increase the energy of the arc, the range of welding currents necessary for ensuring a good and stable arc has an intimate relation with the above-mentioned range of wire diameters. FIG. 3 schematically shows the relationship between the wire diameter and the welding current in relation with the stable arc region. In the Figure, in the case of region (I) where the welding currents are high relative to the wire diameters, the arc length becomes extremely short and thus the base metal is deeply melted making it difficult to deposit a stable bead. On the other hand, in the case of region (III) where the welding currents are low relative to the wire diameters, the arc length is increased thus making the arc unstable. Consequently, region (II) is one where a stable arc and hence an excellent weld bead may be obtained. The inventors have conducted detailed investigations into the range of welding currents which ensures the stable arc of region (II) with wire diameters in the above-mentioned range of wire diameters and have found that the range of welding currents for ensuring a stable arc is such that the welding currents of over 600 amp are necessary for the lower limit of the wire diameter or 3.0 mm $\phi$ and the welding currents of less than 1500 amp are necessary for the upper limit of the wire diameter or 6.4 mm $\phi$.

Figure 4:
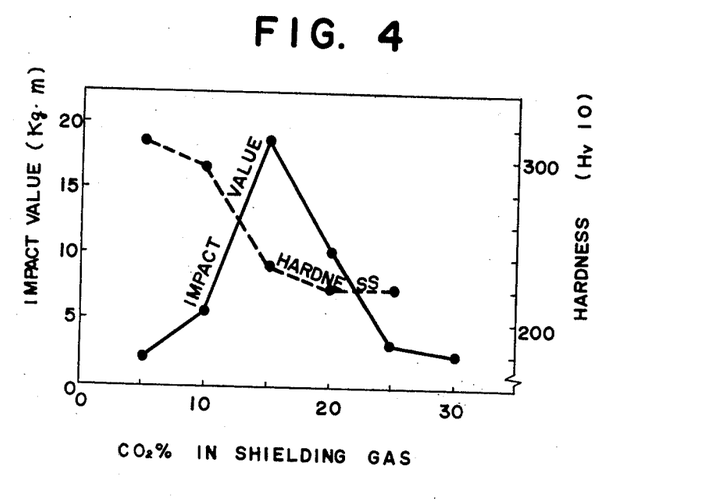
FIG. 4 is a graph showing the relationship between the $CO_2$% in the shielding gas and the impact value and the maximum hardness.

The object of the present invention cannot be attained fully by simply accomplishing the arc welding with the above-mentioned large-diameter wire electrode operated at suitable high welding currents. In other words, the effects of the present invention cannot be obtained unless the welding is accomplished under suitable shielding gas conditions, namely, in a suitable shielding gas atmosphere with a suitable overall flow rate. That is, if the large-current gas shielded arc welding is accomplished simply by using the large diameter wire electrode, due to the high intensity of the arc and the high temperature of the outer portion of the arc, at the moment that the outer peripheral portion of the arc contacts the base metal the latter is melted and gouged deeply. While this is advantageous in the case of high speed welding, even a small variation of the current and voltage causes the arc to become unstable thus giving rise to a humping phenomena or undercuts in the base metal. This tendency tends to become more pronounced as the welding speed increases. In the past, a scheme for preventing such irregularities has been devised in which the length of the wire projected from the forward end of the contact tip or the feeding point is reduced as far as possible to maintain the arc voltage low and thereby to stabilize the arc. In this case, however, the range of the arc voltage setting is such that the maximum range of variation is on the order of 2 volts. It is evident that it is difficult even from the welding operational point of view to accomplish the regular welding of the seam with such a narrow range of arc voltages. The inventors have discovered that these deficiencies can be overcome by accomplishing the welding under specific shielding gas atmospheric conditions. In other words, it has been found that the cause of an unstable arc is the fact that the internal pressure of the arc increases considerably as the welding current increases and consequently a certain pressure may be externally applied to balance against the internal pressure and thereby to provide a stable arc. More specifically, this can be realized by increasing the shielding gas pressure and increasing the shielding gas flow rate. The merit of this method also makes it possible to obtain a stable arc with a wide range of arc voltages between 23 and 36 volts for the large-diameter wires of over 3.0 mm $\phi$ which are used in the welding process of the invention, independently of the wire diameters. The lower limit of the shielding gas flow is set at 50 l/min for the reason that if the welding is accomplished at high welding speeds as used in the process of the invention, violent boiling and evaporation of the weld metal occur in the molten pool making it impossible to control the arc voltage. On the other hand, since excessive shielding gas flow rates have the danger of depressing the molten metal and causing a cavity in the central portion thereof and since such excessive flow rates rapidly cool the outer peripheral portion of the arc thus reducing the spread of the heat and making the arc unsuitable for high speed welding, the upper limit of the flow rates is set at 200 l/min. As regards the type of shielding, the combined more of a double shield torch and an aftershield device reduces the effects of the invention in no way and it is needless to say that the combination may be used under suitable conditions. In the case of a multiple electrode welding, the shielding gas flow rate in the above-mentioned range is necessary for each electrode. As regards the shielding gas composition, it is desirable to introduce a certain amount of an active gas into pure argon for the purposes of stabilizing the arc and preventing the occurrence of undercuts. However, the addition of an active gas in any excessive amount tends to ruin the fine finish of the weld bead and give rise to such irregularities as boiling and evaporation of the weld metal and thus the upper limit is set at 5% for oxygen, while in the case of carbon dioxide gas, as will be seen from FIG. 4, the addition of $CO_2$ has an intimate relation with the properties, particularly the impact value and maximum hardness of the weld metal and therefore the addition of $CO_2$ in amounts less than 30% has beneficial effects on the properties in the weld metal.

On the other hand, arc voltages lower than 23 volts tend to cause a violent spattering where the shielding gas contains carbon dioxide gas. With arc voltages higher than 36 volts, the arc length increases and the arc tends to become unstable. Consequently, the voltages suitable for ensuring a stable arc are in the range of 23 to 36 volts.

As regards the welding speed, the upper limit is set at 1500 mm/min since the welding speeds greater than this upper limit ruin the arc stabilizing effect of the shielding gas flow rate constituting the feature of the invention, whereas the welding speeds lower than 300 mm/min result in a considerable decrease in the welding efficiency in consideration of the regular welding of the seam.

Still another feature of the welding process of the invention is the use of a multiple electrode welding process wherein two or more electrodes each having the same function as the above-mentioned large-diameter electrode are provided and the distance between the leading and trailing electrodes is made adjustable within the range of 10 to 100 cm and this multiple electrode process has the following merits. In this case, the shielding gas composition, overall flow rate, welding current, arc voltage, welding speed and electrode wire diameter are all within the above-mentioned ranges. In other words, by properly adjusting the distance between the electrodes, it is possible to control the high rate of cooling of the heat affectd zone which is inevitably becaused by the low heat input and in this way the occurrence of a pronounced hardening phenomenon may be avoided. Moreover, part of the heat affected zone which has been hardened by the heat effect of the leading electrode may be softened by the tempering effect of the trailing electrode. On the other hand, since the heat affected zone by the trailing electrode has its base metal portion previously preheated by the leading electrode, the rate of cooling of the base metal from its elevated temperature is reduced and hence the degree of hardening is reduced. It will thus be seen that the merits of the multiple electrode welding are best suited for obtaining the desired properties of the steel pipe according to the invention and the desired high toughness and reduced maximum hardness may be easily obtained.

It has also been found that the use of the multiple electrode welding process is very useful in improving the impact properties in the weld metal. In other words, while the degree of dilution with the base metal of the weld bead made by the leading electrode differs from that of the weld bead made by the trailing electrode, it is possible to control the alloy composition of the weld metal by using different wires or different shielding gas compositions or different wires and different shielding gas compositions for the respective electrodes and the weld metal with excellent properties may be obtained by selecting the welding conditions which provide a suitable alloy composition.

The fourth important feature or constituent element of the present invention consists in the welding material or wire. This feature resides in that the welding material contains Ti or Ti and B as the essential element or elements for ensuring weld metal impact values over 7 Kg.m at −50° F. In other words, in the large-current gas shielded arc welding according to the invention, the welding is accomplished by operating the large-diameter wire at high welding currents so that the bead formed by each pass has extremely large volume and weight and moreover the bead is cooled rapidly due to the relatively low welding heat input. Consequently, there is the possibility that in some extreme cases the dendrite structure formed during the solidification of the weld metal rapidly grows in certain directions and causes a solidification crack in that portion where these growing structures meet. Where the rapid growth of the dendrite has not caused a weld crack, the rapid growth of the dendrite still has considerable effects on the impact properties in the weld metal. The inventors have repeatedly conducted a large number of experiments and have found that the addition of Ti or B or both as the constituent elements of the welding material has the effect of preventing the growth of the dendrite. Namely, Ti and B combine with oxygen or nitrogen introduced from the surrounding air or the shielding gas so that part of these elements precipitates as the oxides or nitrides in the weld metal and this has the effect of preventing the growth of the dendrite. However, it has also been found that the addition of Ti in amounts greater than 0.3% results in the precipitation of coarse titannitride and this deteriorates the impact properties of the weld metal. On the other hand, while B is effective when it is present as precipitates B causes the weld metal to harden considerably when it is present as a solid solution element in the ferrite or at grain boundaries. The limits are in the range of 0.0005 to 0.01%. Where both Ti and B are present, the limits of these elements are Ti, 0.01 to 0.30% and B, 0.005 to 0.01%. If the deoxidation and fixation of nitrogen are accomplished satisfactorily with these elements during the welding operation, the resulting weld metal in its as-welded condition exhibits quite excellent impact values and these impact properties will not be deteriorated by a short-time heat treatment that will be described later. While only the chemical composition limits of Ti or Ti and B in the welding material according to the invention have been described, the following elements may also be added within the following chemical composition limits. Namely, the welding material may contain less than 0.9% of Si, less than 3.0% of Mn and less than 0.15% of C as principal constituents, and at least one of the following elements, i.e., less than 11.5% of Ni, less than 1.0% of Mo and Cr, less than 0.1% of Al and less than 0.2% of Zr. As mentioned earlier, by using the solid wire electrode having such a composition, it is possible to easily provide in the deposited metal excellent impact properties of over 7 Kg.m at −50° F.

Figure 5:
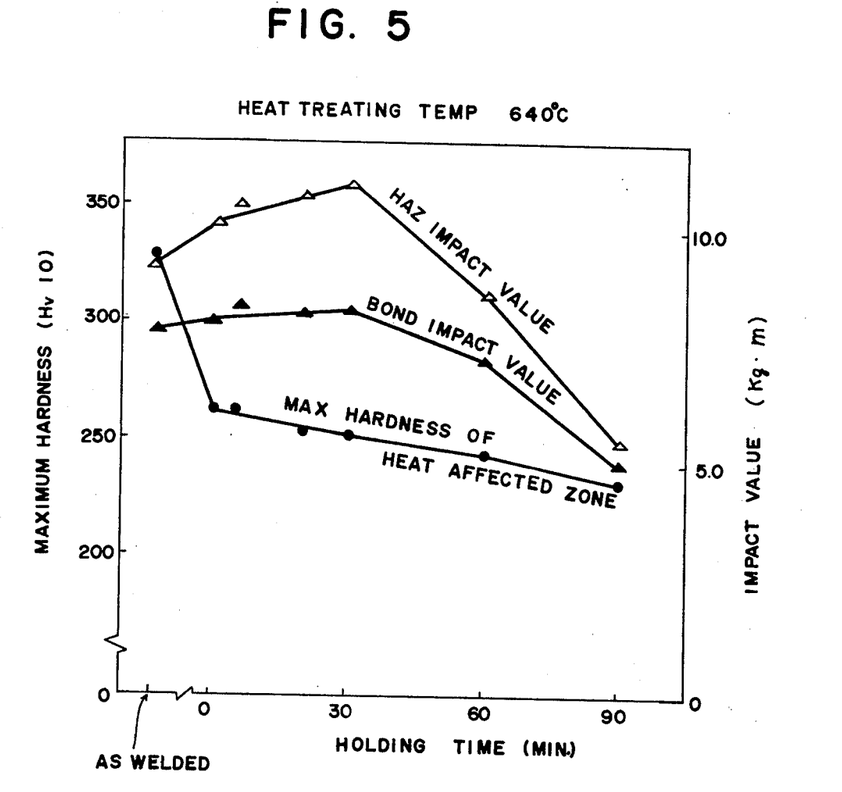
FIG. 5 is a graph showing the effect of the post heat treatment on the properties in the heat affected zone.

The third feature of the present invention, i.e., the heat treatment after the manufacture of welded pipe will now be described in greater detail. This heat treatment is effected only when the value of $C_{eq}$ is over 0.50 with the Mn content of less than 1.0% or when the value of $C_{eq}$ is over 0.45 with the Mn content being more than 1.0% and less than 2.0%, and when the value of $C_{eq}$ is less than 0.65. It will be seen from the foregoing that where a steel plate having a high carbon equivalent($C_{eq}$) is formed into a tubular shape and then subjected to regular welding by the above-mentioned large-current gas shielded welding process, the low temperature toughness in the resulting welding heat affected zone is excellent due to the fact that despite the welding process being high speed and high efficiency its heat input is low as compared with that of the conventional submerged arc welding process. However, as will be seen from FIG. 2, it is a matter of course that an increased carbon equivalent considerably increases the maximum hardness of the welding heat affected zone and this tends to give rise to corrosion cracking by the sulfides in the substance being conveyed. Such a high maximum hardness of the steel plate may be reduced by the following post heat treatment without any loss of low temperature toughness. In other words, it has been confirmed that the maximum hardness of the welded pipe may be easily reduced by holding the steel pipe, after the welding operation, at a suitable temperature in the range of 500° to 700° C for less than 1 hour. These heating temperatures and holding times are dependent on the chemical composition and welding conditions of the steel pipe. Heating temperatures lower than 500° C produce no marked softening effect, whereas heating temperatures over 700° C cause deterioration in the strength and toughness of the base metal portion and the weld zone (the heat affected zone and the deposited metal). FIG. 5 shows by way of example the effect of the holding time on the properties. As will be seen from FIG. 5, it is apparent that when the steel pipe is cooled at the instant that its temperature reaches a suitable temperature in the above-mentioned range, namely, when the holding time is zero, the heat treatment can still have sufficient effects on the properties. On the other hand, holding times longer than 1 hour show no marked effects and there are cases where the longer holding times cause considerable deterioration in the strength and toughness of the steel pipe. Post heat treatment may be performed by any one of numerous methods provided that the desired heating temperature and holding time are ensured. For instance, the post annealing method, high frequency heating method, low frequency heating method, furnace heating method or the like may be suitably used. This post heat treatment is performed so that in the steel pipe having a sufficient toughness in its as-welded condition the maximum hardness of the welding heat affected zone is reduced without any deterioration of the toughness.

DESCRIPTION OF THE PREFERRED EMBODIMENTS

The following examples describe in greater detail the excellent functions, effects and merits of the manufacturing method according to the invention.

Figure 6:
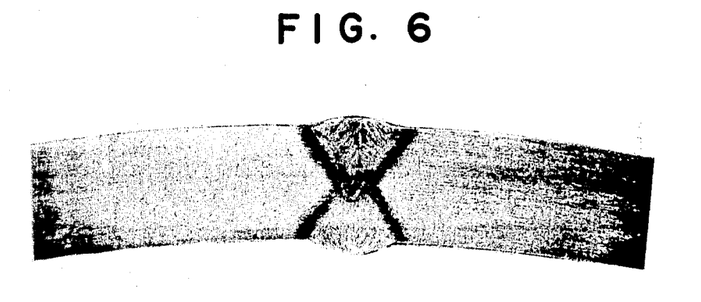
FIG. 6 is a photograph showing the full-sized macrostructure of the weld zone.

FIG. 6 shows the as-welded macrostructure of the weld zone in a 25 mm thick steel pipe welded on each side of the seam, one pass per electrode. This macrostructure is a full-sized one and it was obtained with the following welding conditions.

| Two-electrode gas shielded arc welding | |
|---|---|
| Leading electrode | 29V × 830A × 600 mm/min Ar + 15 % CO$_2$ |
| Trailing electrode | 31V × 700A × 600 mm/min Ar + 5 % CO$_2$ |
| Interelectrode distance | 350 mm |
| Wire diameter | 4.0 mm $\phi$ |

It will be seen from FIG. 6 that the width of the heat affected zone (HAZ) is as narrow as 3 to 4 mm. This is quite excellent as compared with about 10 mm of the heat affected zone produced by the conventional submerged arc welding process. While the above-mentioned heat input is somewhat high as compared with that of the conventional gas shielded arc welding, the heat input is lower than that of the submerged arc welding and this fact, along with the high stability of the arc in the method of the invention, contributed to the production of the sound weld metal with no defects as shown in the Figure.

Tests were conducted on steel plates A, B, C, D, E and F which were manufactured by melting different chemical compositions according to the method of the invention and comparative steel plates G, H and I, J. The following Table 1 shows the chemical compositions, manufacturing conditions and mechanical properties of these exemplary materials. In Table 1, the mechanical properties of the base metals show the values of their central portions in the thick direction which were measured in the circumferential direction of the pipes, the yield point and tensile strength of the pipes were measured by using test pieces cut from the pipes and then straightened, and the DWTT test results show the 85% SATT values of the test specimens of 20 mm thick (the materials over 20 mm thick were reduced to 20 mm thick). The mechanical properties of the weld zones show the values measured at positions 2 mm below the final layer side surface which were considered hardened to the highest degree, while the impact test results show the average value of a large number of tests made at different positions in the thickness direction of the joint plate.

Table 1

| Type of Steel | | Plate thickness (mm) | Pipe diameter (inch) | Chemical composition of steel plate (%) | | | | | | | | | | | Ceq | Mechanical properties of steel plate | | | | | Mechanical properties of steel pipe | | Mechanical properties of steel pipe weld zone | | | | Heat treatment of steel plate | Pipe forming method |
| --- | --- | --- | --- | --- | --- | --- | --- | --- | --- | --- | --- | --- | --- | --- | --- | --- | --- | --- | --- | --- | --- | --- | --- | --- | --- | --- | --- | --- |
| | | | | C | Si | Mn | P | S | Cu | Ni | Cr | Mo | Sol Al | | Y.P (Kg/mm²) | T.S (Kg/mm²) | Y.R (%) | Trs (°C) | Es (Kg.m) | DWTT (85%SATT) | Hv10 max | Test temperature | Bond vE- (Kg.m) | HAZ vE- (Kg.m) | | |
| Present Invention | A | 25 | 48 | .07 | .19 | .71 | .004 | .009 | — | 3.54 | .56 | .33 | .018 | .48 | 50.8 | 63.5 | 77 | −142 | 19.4 | −62°C | 256 | −62 | 9.4 | 14.3 | Multiple QT | UOE |
| | B | 25.7 | 48 | .08 | .32 | 1.31 | .010 | .007 | — | 0.78 | — | .16 | .023 | .37 | 47.7 | 57.3 | 83.2 | −78 | 25.3 | — | 245 | −30 | 15.5 | 18.3 | QT | UOE |
| | C | 32 | 48 | .10 | .24 | .58 | .007 | .008 | — | 3.45 | — | — | .02 | .29 | 47.3 | 60.9 | 77.7 | −95 | 15.2 | — | 209 | −62 | 9.8 | 13.5 | " | B.R |
| | D | 20 | 48 | .08 | .17 | .45 | .010 | .014 | .70 | 4.93 | .39 | .17 | — | .41 | 60.8 | 80.5 | 75.5 | −146 | 15.2 | −80°C | 235 | −62 | 9.1 | 13.4 | Multiple QT | B.R |
| | E | 16.5 | 48 | .08 | .20 | 1.40 | .009 | .007 | — | 1.98 | — | .17 | .064 | .41 | 45.6 | 60.5 | 75.4 | −108 | 17.0 | −70°C | 265 | −62 | 10.2 | 15.5 | CR-es | UOE |
| | F | 20.3 | 48 | .08 | .33 | 1.56 | .004 | .011 | .15 | .18 | V .10 | Nb .04 | .046 | .39 | 51.1 | 62.4 | 81.9 | −83 | 10.6 | −23°C | 258 | −20 | 8.5 | 9.5 | Rolled | UOE |
| Comparison steel | G | 25.0 | 48 | .05 | .21 | 1.31 | .004 | .012 | — | 2.84 | .54 | .33 | — | .55 | 49.3 | 66.0 | 74.7 | −120 | 11.5 | −57°C | 328* | −62 | 7.8 | 9.2 | Multiple QT | UOE |
| | H | 25.0 | 48 | .08 | .14 | .74 | .007 | .011 | .02 | 4.88 | .78 | .17 | .025 | .53 | 56.0 | 74.3 | 75.4 | −138 | 17.3 | −77°C | 305* | −62 | 12.3 | 17.3 | " | UOE |
| | I | 25.0 | 48 | .06 | .24 | 1.41 | .014 | .010 | — | 2.06 | — | 0.27 | — | 0.43 | 44.6 | 60.8 | 73.3 | −110 | 17.9 | −63°C | 275 | −20 | 6.4* | 5.8* | " | UOE |
| | J | 25.0 | 48 | .10 | .33 | 1.60 | .011 | .009 | .73 | 2.88 | 0.60 | 0.50 | — | .69 | 56.2 | 67.8 | 83.0 | −144 | 15.4 | −80°C | 356* | −62 | 9.8 | 12.6 | " | UOE |

(Notes)
Steel (I) alone was welded into pipe by tandem sequence, submerged arc welding process. Other steels (A) — (J) were welded into pipe by tandem sequence, large-current gas shielded arc welding process
*Values not in the ranges of the invention It will be seen from the above Table 1 that the values of $C_{eq}$ corresponding to the Mn content of the comparative cases G and H are outside the ranges of the present invention. Consequently, while the strength and toughness of the base metals are satisfactory, their mechanical properties, particularly Hv10 max values of the weld zone (the deposited metal and the H.A.Z) of the welded pipes are unsatisfactory or abnormally high. However, these defects were remedied by the heat treatment that will be described later. Similarly, the comparative case J was shown as another example of steel with an abnormally high value of $C_{eq}$. In this steel, the $C_{eq}$ value was 0.69 despite the fact that the Mn content of 1.60% dictated the adjustment of the $C_{eq}$ value to below 0.45 and consequently the Hv10 max of the weld zone showed an abnormally high value of 356.

bon equivalents were less than 0.45. As in the case of the above-mentioned A, C and D, the properties in both the base metals and the weld zones were excellent.

As described above, it has been proved that the mechanical properties of the steel pipes manufactured according to the method of the invention were excellent as compared with those of steel pipes manufactured by the conventional methods. However, there still remained the problem of welding efficiency as compared with the conventional methods. The following Table 2 shows the results of the comparative tests conducted for this purpose. In these tests, the welding process of the invention was compared with the conventional tandem sequence, submerged arc welding process and MIG welding process employing a small-diameter wire electrode.

Table 2

Figure 7:
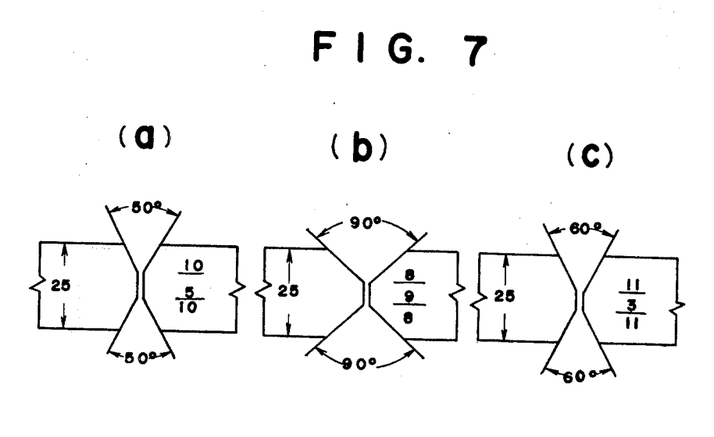
FIGS. 7(a), 7(b) and 7(c) show the groove shapes listed in Table 2.

| Welding condition | Welding Process | | |
|---|---|---|---|
| | (Present invention) Large-current gas shielded arc welding process | (Conventional technique) Tandem sequence, submerged arc welding process | (Conventional technique) Small-wire gas shielded arc welding process |
| Groove shape | FIG. 7(a) | FIG. 7(b) | FIG. 7(c) |
| Groove internal volume (cm³/cm) | 0.93 | 1.28 | 1.40 |
| Electrode wire diameter (mmφ) | 4.0 | 4.8 | 1.6 |
| Number of electrodes | Tandem | Tandem | Single |
| Interelectrode distance (mm) | 350 | 90 | — |
| Welding current (amp) | Leading electrode ≤ 820 | Leading electrode 1100 | ≤ 320 |
| | Trailing electrode ≤ 700 | Trailing electrode 850 | |
| Arc voltage (volt) | Leading electrode ≤ 31 | Leading electrode 40 | ≤ 32 |
| | Trailing electrode ≤ 29 | Trailing electrode 40 | |
| Welding speed (mm/min) | 600 | 700 | 300 |
| Number of passes | 1 pass on each side, totaling 2 passes. | 1 pass on each side, totaling 2 passes. | 13 passes on both sides in the total |
| Welding heat input (KJ/cm) | Leading electrode ≤ 24 | 65 | 18 |
| | Trailing electrode ≤ 22 | | |
| Type of shielding | Leading electrode Ar + 15 % $CO_2$ Trailing electrode Ar + 5 % $CO_2$ | High basic fused flux | Ar + 2 % $CO_2$ |
| Welding efficiency comparison with SAW process as 1 | 0.85 | 1.0 | 0.06 |

This value was abnormally high as compared with the other cases and its remedy was impossible even with the post heat treatment that will be described later.

In comparative case I, on the other hand, while the Mn content and carbon equivalent were within the ranges specified according to the invention, due to the fact that the steel was welded by the conventional large heat input submerged arc welding process, the low temperature toughness at the bond and in the heat affected zone showed an unsatisfactory value, although the strength and toughness of the base metal as well as the Hv10 max value of the weld zone were satisfactory. The defects of the steel pipe manufactured by this welding process could not be remedied by the post heat treatment as will be described later.

The steels A, C and D of the invention contained Mn in amounts less than 1.0%. Since the carbon equivalent in each of these steels was less than 0.50%, the excellent properties of the steel plates provided by the heat treatments listed in the Table were retained in the welded pipes, and the low temperature toughness and the maximum hardness of the weld zone in the as-welded condition also showed quite satisfactory values. In the other steels B, E and F of the invention, the Mn contents were in the range of 1.0 to 1.0% and the car- It will be seen from the above Table 2 that the welding efficiency of the process according to the invention was improved considerably over that of the conventional MIG welding process employing the small-diameter wire electrode and the welding efficiency was as high as satisfactorily comparable with that of the tandem sequence, large heat input submerged arc welding process. It will also be seen from the above Table 2 that the welding heat input was considerably lower than that of the tandem sequence, submerged arc welding process and it was practically as low as that of the small-diameter wire MIG welding process. By virtue of these facts, the method of the invention is capable of manufacturing high strength steel pipe having improved low temperature toughness at high welding speeds with improved efficiency.

The following Table 3 shows the results of the experiments with the post heat treatment according to the invention. The experiments were conducted on the comparative cases G, H, I and J and the improvement of their properties were adjusted.

By the post heat treatment, there was no possibility of the toughness the base metal having been deteriorated, although the toughness might be improved. There was practically no decrease in the strength.

Table 3

| Type of steel | Heat Treatment | Maximum hardness of heat affected zone (Hv10) | Impact properties Test temperature (° C) | Bond (Kg.m) | HAZ (Kg.m) |
| --- | --- | --- | --- | --- | --- |
| G | 640° C × O min holding time ⟶ air cooling | 268 | −62 | 8.2 | 9.5 |
| H | 670° C × 30 min holding time ⟶ air cooling | 245 | −62 | 13.4 | 18.5 |
| I | 640° C × 5 min holding time ⟶ air cooling | 230 | −20 | 6.8* | 5.9* |
| J | 670° C × 60 min holding time ⟶ air cooling | 309* | −62 | 9.5 | 13.4 |

As will be seen from above Table 3, the maximum hardness was lowered by performing the post heat treatment for short periods of time, while there were improving effects on the toughness. However, it should be noted that as a matter of fact there is a limit to these improving effects. For instance, in the case of the comparative case J where the value of $C_{eq}$ was over 0.65 specified by the invention, the deficiencies of the welded pipe were not remedied even with the post heat treatment, thus showing that the chemical composition of a steel plate to be welded must be adjusted with the greatest possible care.

What have been described so far in detail are all concerned with the purposes of ensuring in the weld zone vE values above 7 Kg.m at −10° F. However, where it is desired to ensure vE values above 7 Kg.m at −50° F, a suitably selected composition must be used for the welding material or the solid wire as mentioned earlier. The following examples show the results of the tests conducted on the properties of the weld metals formed by using welding materials of different compositions.

EXAMPLE 1

In this example, the solid wire contained Ti. The welding was accomplished by using the welding process of this invention and the weld metals were tested in their as-welded conditions.

Chemical composition of wire (Comparison) A: 0.08 C, 0.03 Si, 0.60 Mn, 3.45 Ni, 1.02 Mo (Invention) B: 0.06 C, 0.22 Si, 1.80 Mn, 0.90 Ni, 0.49 Mo, 0.23 Ti Composition of steel plate or base metal 0.07 C, 0.23 Si, 0.54 Mn, 0.013 P, 0.006 S, 3.45 Ni, plate thickness 25 mm Welding conditions Single 4.0 mmφ wire electrode, 830A × 29V × 600 mm/min, single layer welding
Impact properties in weld metal
As shown in the following Table 4

Table 4

| Type of wire | Charpy impact test absorbed energy at −80° F (Kg.m) | The same absorbed energy at −10° F (Kg.m) |
| --- | --- | --- |
| A | 0.7 | 7.2 |

Table 4-continued

| Type of wire | Charpy impact test absorbed energy at −80° F (Kg.m) | The same absorbed energy at −10° F (Kg.m) |
| --- | --- | --- |
| B | 8.9 | 13.8 |

EXAMPLE 2

In this example, the wire contained Ti and B and weld metals were tested in their as-welded conditions as in the Example 1.

Wire composition (comparison) A: The same as in the Example 1
(Invention) C: 0.05 C, 0.35 Si, 2.03 Mn, 0.30 Mo, 0.012 P, 0.010 S, 0.16 Ti, 0.008 B Composition of steel plate or base metal The same as in Example 1

Welding conditions

Tandem 4.0 mmφ wire electrodes (interelectrode distance = 350 mm)
Leading electrode 830A × 29V × 600 mm/min (Ar + 15 % $CO_2$)
Trailing electrode 700A × 31V × 600 mm/min (Ar + 5% $CO_2$)
One pass on each side, totaling two passes.
Impact properties in the weld metal
As shown in the following Table 5

Table 5

| Type of wire | Charpy impact tests absorbed energy at −80° F (kg.m) | The same absorbed energy at −10° F (Kg.m) |
| --- | --- | --- |
| A | 0.5 | 7.4 |
| C | 10.3 | 15.6 |

EXAMPLE 3

In this example, the wire had the same composition as in Example 1 and the welded pipe was subjected to the post heat treatment according to the invention. A steel plate having a $C_{eq}$ value not in the range specified by the invention was used as the base plate.

Composition of steel plate or base metal 0.06 C, 0.23 Si, 1.41 Mn, 0.50 Cr, 2.88 Ni, 0.27 Mo, 0.014 P, 0.010 S, $C_{eq}$ 0.55

Welding conditions

The same as in Example 2

Post heat treatment

640° C × 0 min holding time   air cooling
670° C × 30 min holding time   air cooling Impact properties in the weld metal after post heat treatment As shown in the following Table 6

Table 6

| Welding wire | Heat treatment | vE of weld metal at −80° F (Kg.m) | The same at −10° F (Kg.m) |
|---|---|---|---|
| A | 640° C | 0.6 | 7.2 |
|   | 670° C | 0.7 | 7.1 |
| B | 640° C | 10.5 | 18.3 |
|   | 670° C | 11.3 | 19.5 |

EXAMPLE 4

In this example, wire had the same composition as in the Example 2, and steel plate or the base metal of the same type as used in Example 3 was welded with the same welding conditions as used in the Example 2 and then subjected to the same heat treatments as in Example 3. In this example, the effects of the post heat treatments on the wire containing Ti and B were examined. The effects of the post heat treatments on the impact properties in the weld metals were shown in the following Table 7.

Table 7

| Welding wire | Heat treatment | vE of weld metal at −80° F (Kg.m) | The same at −10° F (Kg.m) |
|---|---|---|---|
| A | 640° C | 0.6 | 7.1 |
|   | 670° C | 0.7 | 7.0 |
| C | 640° C | 14.3 | 18.9 |
|   | 670° C | 15.8 | 24.3 |

By referring to the respective tables (Table 4 through 7) for the above-mentioned examples, it will be seen that even with the solid wire having the ordinary composition, it was possible to obtain the vE values which satisfied the desired values of 7 Kg.m at −10° F by following the conditions determined in accordance with the present invention. However, it will also be seen that the values at −80° F were extremely low and therefore the products would not be suitable for some applications. Where the solid wires having the compositions according to the invention were used, these values were improved markedly. Thus, it is necessary to select a solid wire having the optimum composition by taking into consideration the conditions under which a steel pipe manufactured by the method of this invention is to be installed.

It will thus be seen from the foregoing detailed description that in accordance with the present invention it is possible to manufacture a steel pipe having an improved strength and an excellent low temperature toughness by properly adjusting the chemical composition and carbon equivalent of a steel to be welded and the use of such a steel as the base metal has made it possible for the first time to use a single electrode or multiple electrode large-current gas shielded arc welding process which ensures high welding currents and high welding efficiency despite its low heat input. With the method of this invention, it is thus possible to easily and stably manufacture a thick, low-temperature high-strength steel pipe having, in its as-welded condition or post heat treated condition, an improved low temperature toughness without any abnormal increase in the maximum hardness of the weld zone.

We claim:

1. A method of manufacturing a thick, low-temperature high-strength steel pipe comprising the steps of:
   a. forming into a tubular shape a steel plate having a thickness of over 12 mm and containing: C, 0.01 to 0.15%; Si, 0.02 to 0.50%; Mn, 0.1 to 2.0%, P, less than 0.020%; S, less than 0.020%; at least one element selected from the group consisting of Cu, Ni, Cr, Mo and W in an amount between 0.1 and 1.0% when selecting Cu, Cr, Mo and W, and, in an amount between 0.1 and 9.50% when selecting Ni; at least one element selected from the group consisting of Sol Al, Zr, Ti, V, Nb and B in a total amount between 0.005 and 0.20%, the remainder being Fe and unavoidable impurities, the carbon equivalent of said steel being so adjusted that said carbon equivalent is less than 0.50 when said Mn content is less than 1.0%, whereas said carbon equivalent is less than 0.45 when said Mn content is over 1.0%; and
   b. welding said formed steel plate into a steel pipe by subjecting said steel plate to large-current gas shielded arc welding using at least one consumable electrode, one pass per electrode on each side of the seam of said formed steel plate, in an atmosphere of a mixed shielding gas consisting essentially of an inert gas and an active gas selected from the group consisting of carbon dioxide in an amount less than 30% and oxygen in an amount less than 5% and supplied at an overall flow rate between 50 and 200 l/min wherein said consumable electrode comprises Ti in the range of 0.01 and 0.3%, has a diameter between 3.0 and 6.4 mm$\phi$ operating at a welding current between 600 and 1500 amp, arc voltage between 23 and 36 volts and welding speed between 300 and 1500 mm/min; and said steel pipe having, in the as-welded condition thereof, mechanical properties such that the yield point of the base metal portion of said steel pipe is over 60,000 psi and the weld zone of said steel pipe has a maximum hardness of less than Hv10-280 and a Charpy test absorbed energy of over 7 Kg.m at −10° F.

2. A method according to claim 1, wherein said consumable electrode also comprises B in the range of 0.0005 to 0.01%.

3. A method of manufacturing a thick, low-temperature high-strength steel pipe comprising the steps of:
   a. forming into a tubular shape a steel plate having a thickness of over 12 mm and containing: C, 0.01 to 0.15%; Si, 0.02 to 0.50%; Mn, 0.1 to 2.0%; P, less than 0.020%; S, less than 0.020%; at least one element selected from the group consisting of Cu, Ni, Cr, Mo and W in the range of 0.1 to 1.0% when selecting Cu, Cr, Mo and W and in the range of 0.1 to 9.50% when selecting Ni; at least one element selected from the group consisting of Sol Al, Zr, Ti, V, Nb and B in a total amount between 0.005 and 0.20%, the remainder being Fe and unavoidable impurities, the carbon equivalent of said steel plate being adjusted to below 0.65;

b. welding said formed steel plate into a steel pipe by subjecting said formed steel plate to large-current gas shielded arc welding using at least one consumable electrode, one pass per electrode on each side of the seam thereof, in an atmosphere of a mixed shielding gas consisting essentially of an inert gas and an active gas selected from the group consisting of carbon dioxide in an amount less than 30% and oxygen in an amount less than 5% and supplied at an overall flow rate between 50 and 200 l/min wherein said consumable electrode comprises Ti in the range of 0.01 to 0.3%, has a diameter between 3.0 and 6.4 mm $\phi$ operating at a welding current between 600 and 1500 amp, arc voltage between 23 and 36 volts and welding speed between 300 and 1500 mm/min; and c. subjecting said welded steel pipe to a post heat treatment in which said steel pipe is held at a temperature between 500° and 700° C for less than one hour;

and said steel pipe having mechanical properties such that the yield point of the base metal portion of said steel pipe is over 60,000 psi and the weld zone of said steel pipe has a maximum hardness of less than Hv10-280 and a Charpy test absorbed energy of over 7 Kg.m at −10° F.

4. A method according to claim 3, wherein said consumable electrode also comprises B in the range of 0.0005 to 0.01%.

* * * * *